Dec. 26, 1939.                R. G. DANLEY                2,184,505
                          PLUMB BOB WINDSHIELD
                          Filed March 4, 1938

Inventor
R. G. Danley
By
Attorneys

Patented Dec. 26, 1939

2,184,505

UNITED STATES PATENT OFFICE 2,184,505

PLUMB BOB WINDSHIELD

Rhett Gorman Danley, Lawrenceburg, Tenn.

Application March 4, 1938, Serial No. 193,845

7 Claims. (Cl. 33—216)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a plumb bob windshield and is particularly adapted for use on surveyors' instruments requiring the use of plumb bobs, such as levels and transits.

The object of this invention is to provide a windshield for a plumb bob and the string by which it is suspended while being used on one of said instruments in making a set up over an established point, thereby enabling the plumb bob to swing absolutely free and perpendicular.

The following specification, considered together with the accompanying drawing, will fully disclose this invention and further objects and advantages thereof will be apparent.

In the drawing:

Figure 6 is an enlarged perspective of the member designated 6 in Figure 2.

Figure 1:
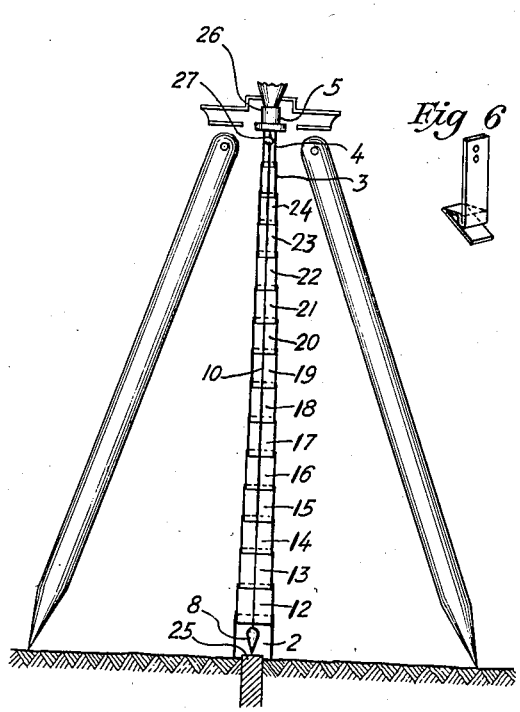
Figure 1 shows a cross-sectional elevational view of this invention attached to the bottom of a surveying instrument.
Figure 2:
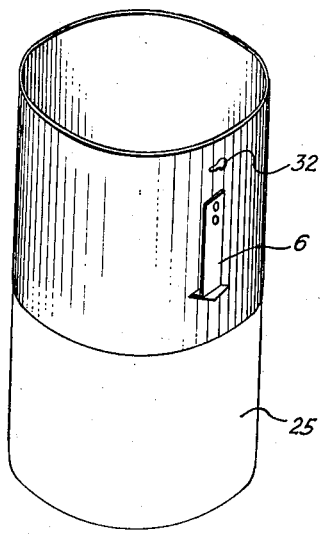
Figure 2 is an enlarged perspective view of the member designated by the numeral 2 in Figure 1.
Figures 3, 4:
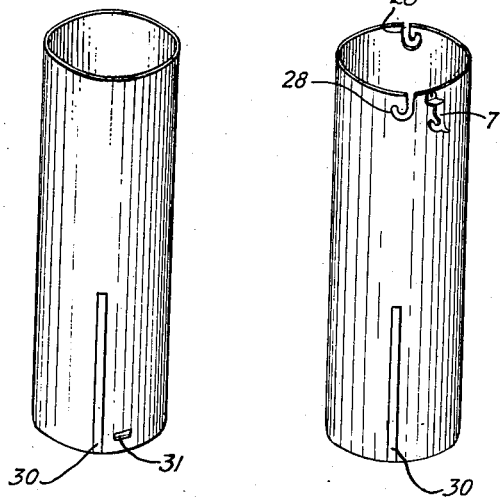
Figure 3 is an enlarged perspective view of the member designated by the numeral 12 in Figure 1.
Figure 4 is an enlarged perspective view of the member designated by the numeral 4 in Figure 1.
Figure 5:
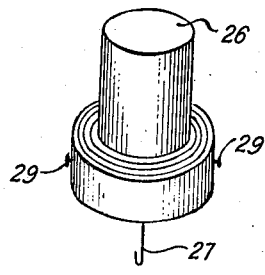
Figure 5 is an enlarged perspective view of the member designated by the numeral 5 in Figure 1.
Figure 7:
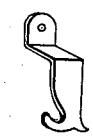
Figure 7 is an enlarged perspective of the member designated 7 in Figure 4.

Referring with more particularity to the drawing in which like parts are designated by like numerals, a plurality of telescopable sections, preferably sixteen, designated by the numerals 2, 12, 13, 14, 15, 16, 17, 18, 19, 20, 21, 22, 23, 24, 3, 4, are adapted to encompass a plumb bob 8 and the plumb bob string 10, and are suspended together from a surveying instrument by attachments hereinafter more fully described. Said telescopable sections, when suspended from the surveying instrument, form an elongated shield for the plumb bob and plumb bob string. The lower part 25 of the base section 2 is composed of any transparent material, such as glass, so that the plumb bob and the point over which it is to be set are visible from the exterior. The section 5 has its upper portion 26 threaded the same as a plumb bob nut or stud on a conventional surveying instrument, and is thus adapted to be attached to such a surveying instrument in the same manner as an ordinary plumb bob. The lower part of this section 5 carries a hook 27 on which the plumb bob string is suspended.

The section 4 is attached to the section 5 by means of two diametrically opposite slotted sections 28 28 designed to register with the studs 29 29.

Vertical slots 30 are provided in all section members except members 2 and 5. These slots are designed to receive dot studs (not shown) embraced within each section. These studs can be placed at points to give the desired overlap of the sections. In connection with this construction, it is to be understood that the sections fit together snugly but freely.

The section 12 is provided with an aperture 31 designed to fall in registry with the spring lock member 6 through an aperture in section 2 when the sections are elongated to prevent section 12 from telescoping with section 2 and obstructing the view of the plumb bob through the transparent section. The hook 7 of the section member 4 is designed to catch over the stud 32 on the section member 2 when the sections are telescoped to prevent the shield from elongating when not in use.

All other sections of the shield not hereinbefore particularly described are designed like the member 12 except for the fact that they do not carry the aperture 31.

The hook 7 is pivotally mounted near the top of the section member 4 and extends laterally from the pivot point so as to engage the stud 32 of the section member 2.

Having thus described my invention, I claim:

1. A plumb bob and plumb bob string windshield comprising a plurality of similar telescopable sections and means for attaching said windshield to a surveying instrument, characterized by the fact that it can be collapsed for the purpose of conveniently carrying it about on the person.

2. A plumb bob and plumb bob string windshield comprising a plurality of similar telescopable sections, means for attaching said windshield to a surveying instrument, and means for attaching a plumb bob to said surveying instrument on the interior of said windshield, characterized by the fact that it can be collapsed for the purpose of conveniently carrying it about on the person.

3. A plumb bob and plumb bob string windshield comprising a plurality of similar telescopable in series attached sections, means carried by said windshield for removable attachment to a surveying instrument, means for attaching a plumb bob to said surveying instrument on the interior of said windshield, the lowest section of the series being open at its bottom, said section also being transparent to permit observation of any movements of said plumb bob over an established point.

4. A plumb bob and plumb bob string windshield comprising a plurality of similar telescopable sections in series attached, means carried by said windshield for attachment to a surveying instrument, means for removably attaching a plumb bob to said surveying instrument on the interior of said windshield, the lowest section of the series being open at its bottom, said section also being transparent to permit observation of any movement of said plumb bob over an established point, and means for retaining said windshield in a telescoped assembly when not in use.

5. In combination with a surveying instrument, an extensible windshield for a plumb bob and its supporting string, comprising a plurality of progressively reduced similar telescopable sections in series attached, means carried by the smallest of said sections for attaching the shield to said surveying instrument, means for removably attaching a plumb bob to said surveying instrument on the interior of said shield, the largest section of the series being open at the bottom, said section being also transparent to permit observations of the tip of the plumb bob.

6. A shield for a plumb bob and its supporting string in combination with a support therefor, comprising a hollow tube formed of a plurality of collapsible sections, means for suspending said hollow tube in a vertical position, means for removably suspending the plumb bob and its supporting string axially within said hollow tube, said tube being open at its lower end and having transparent means for observing the position of the plumb bob therewithin.

7. A shield for a plumb bob and its supporting string in combination with a support therefor, comprising a hollow tube formed of a plurality of collapsible sections, means for suspending said hollow tube in a vertical position, means for removably suspending the plumb bob and its supporting string axially within said hollow tube, said tube being open at its lower end and having transparent means for observing the position of the plumb bob therewithin, and means for holding said tube in a collapsed form, the shield in this collapsed form being characterized by the fact that it can be conveniently carried about on the person.

R. G. DANLEY.